(12) United States Patent
Fujisawa et al.

(10) Patent No.: US 7,529,934 B2
(45) Date of Patent: *May 5, 2009

(54) INDIVIDUAL CERTIFICATION METHOD

(75) Inventors: Tomonori Fujisawa, Tokyo (JP); Shouji Satou, Kuroiso (JP)

(73) Assignee: Kabushiki Kaisha Eighting, Tokyo (JP)

( * ) Notice: Subject to any disclaimer, the term of this patent is extended or adjusted under 35 U.S.C. 154(b) by 905 days.

This patent is subject to a terminal disclaimer.

(21) Appl. No.: 10/488,163

(22) PCT Filed: Sep. 2, 2002

(86) PCT No.: PCT/JP02/08902

§ 371 (c)(1),
(2), (4) Date: Mar. 1, 2004

(87) PCT Pub. No.: WO03/021457

PCT Pub. Date: Mar. 13, 2003

(65) Prior Publication Data

US 2004/0250068 A1 Dec. 9, 2004

(30) Foreign Application Priority Data

Sep. 3, 2001 (JP) .............................. 2001-265929

(51) Int. Cl.
*H04L 9/00* (2006.01)
(52) U.S. Cl. ........................ 713/168; 713/155; 713/161; 713/171; 380/270; 705/67
(58) Field of Classification Search .................. 713/155, 713/161, 171, 168; 380/270; 705/67
See application file for complete search history.

(56) References Cited

U.S. PATENT DOCUMENTS

| | | | |
|---|---|---|---|
| 2002/0003892 A1* | 1/2002 | Iwanaga | 382/124 |
| 2002/0113866 A1* | 8/2002 | Taniguchi et al. | 348/51 |
| 2003/0023566 A1 | 1/2003 | Fujisawa et al. | |
| 2003/0204725 A1* | 10/2003 | Itoi et al. | 713/168 |

OTHER PUBLICATIONS

Patent Abstracts of Japan; Publication No. 08-227397; Publication Date Sep. 3, 1996; Applicant Sun Microsyst Inc.
Patent Abstracts of Japan; Publication No. 10-341224; Publication Date Dec. 22, 1998; Applicant Schmitz Kim.
Patent Abstracts of Japan; Publication No. 2001-148037; Publication Date May 29, 2001; Applicant Open Loop: KK.
Patent Abstracts of Japan; Publication No. 2001-005883; Publication Date Jan. 12, 2001; Applicant NTT Data Corp.
Patent Abstracts of Japan; Publication No. 10-303886; Publicatoin Date Nov. 13, 1998; Applicant Sony Corp.

(Continued)

*Primary Examiner*—Kambiz Zand
*Assistant Examiner*—Tongoc Tran
(74) *Attorney, Agent, or Firm*—Manabu Kanesaka

(57) ABSTRACT

The present invention provides a safe and quick individual authentication method using a mobile terminal. When authentication is demanded from a mobile terminal 30 to an authentication server 10, the authentication server 10 transmits verification code for authentication to the mobile terminal 30. The mobile terminal 30 returns the verification code through a sales management server 23 via a reader 21 or the like to the authentication server 10 for authentication. The authentication server 10 verifies the returned verification code to the verification code previously generated, and returns a result of the verification and personal data required by the sales management server 23 to the sales management server 23.

11 Claims, 10 Drawing Sheets

OTHER PUBLICATIONS

Patent Abstracts of Japan; Publication No. 2000-010927 Publication Date Jan. 14, 2000; Applicant NEC Yonezawa Ltd.

Patent Abstracts of Japan; Publication No. 08-129591; Publication Date May 21, 1996; Applicant Hokkaido Oki Denki syst: KK et al.

* cited by examiner

INDIVIDUAL CERTIFICATION METHOD

FIELD OF THE INVENTION

The present invention relates to an individual authentication method using a mobile terminal.

BACKGROUND TECHNOLOGY

Conventionally individual authentication has been carried out mainly by using a plastic card with a magnetic tape adhered thereon as represented by a credit card, and in this method, information on each individual stored in the magnetic tape is read by a card reader, and the individual is identified by verifying the read information to data specific to a company managing the credit system. Recently, however, criminal activities such as forgery of a credit card often occur, and therefore IC cards which are difficult to forge have been introduced as a tool for individual authentication.

In addition, in a case of online authentication, the encryption technology or personal identification numbers are combined with the conventional individual authentication method for improving the security, and therefore the risk that a card number is illegally read from the outside is low.

Further there has been known, as an individual authentication method using a mobile terminal, the method for individual authentication in which a user previously receives individual identification data issued from a credit company via a mobile terminal and individual authentication is carried out by verifying the user's personal identification number to the individual identification data stored in the mobile terminal when payment is made.

In any of the methods such as the use of an IC card, online authentication, and individual authentication via a mobile terminal, however, fundamental solution to the various problems associated with the individual authentication is not given so long as the problems of "fixed information" and "presence of card writers". Further, the problems associated with the online payment for cyber business, which is expected to substantially increase in the future, have not been solved.

DISCLOSURE OF THE INVENTION

The present invention provides a safe and rapid individual authentication method using a mobile terminal, in which meaningless and not-fixed signal information is temporally used between networks in which the security has not been established.

The present invention provides an individual authentication method in which a user receives with his or her mobile terminal verification code generated by an authentication server upon a request from the user's mobile terminal; this verification code is returned from a sales management server to the authentication server; the verification code generated in the authentication server is verified to that sent via the sales management server; and the user's personal information corresponding to the verification code is transmitted to the sales management server when the two types of verification code are identical, and the individual authentication method is characterized in that the verification code received by the mobile terminal is displayed as an image.

Preferably the verification code received by the mobile terminal is read with an image reader connected to the sales management server. Preferably the image display is provided as a dot display with a specific color. Preferably the image reader has a means for analyzing the dot display with a specific color. Preferably the verification code comprises code not having any relation with the personal information. The verification code should not preferably be identical to any verification code generated by the authentication server in the past. Further preferably, after the verification code is generated, the authentication server deletes the generated verification code at a prespecified period of time to disable the verification.

BEST MODE FOR CARRYING OUT THE INVENTION

A preferred embodiment of the present invention is described below with reference to the related drawings.

Figure 1:
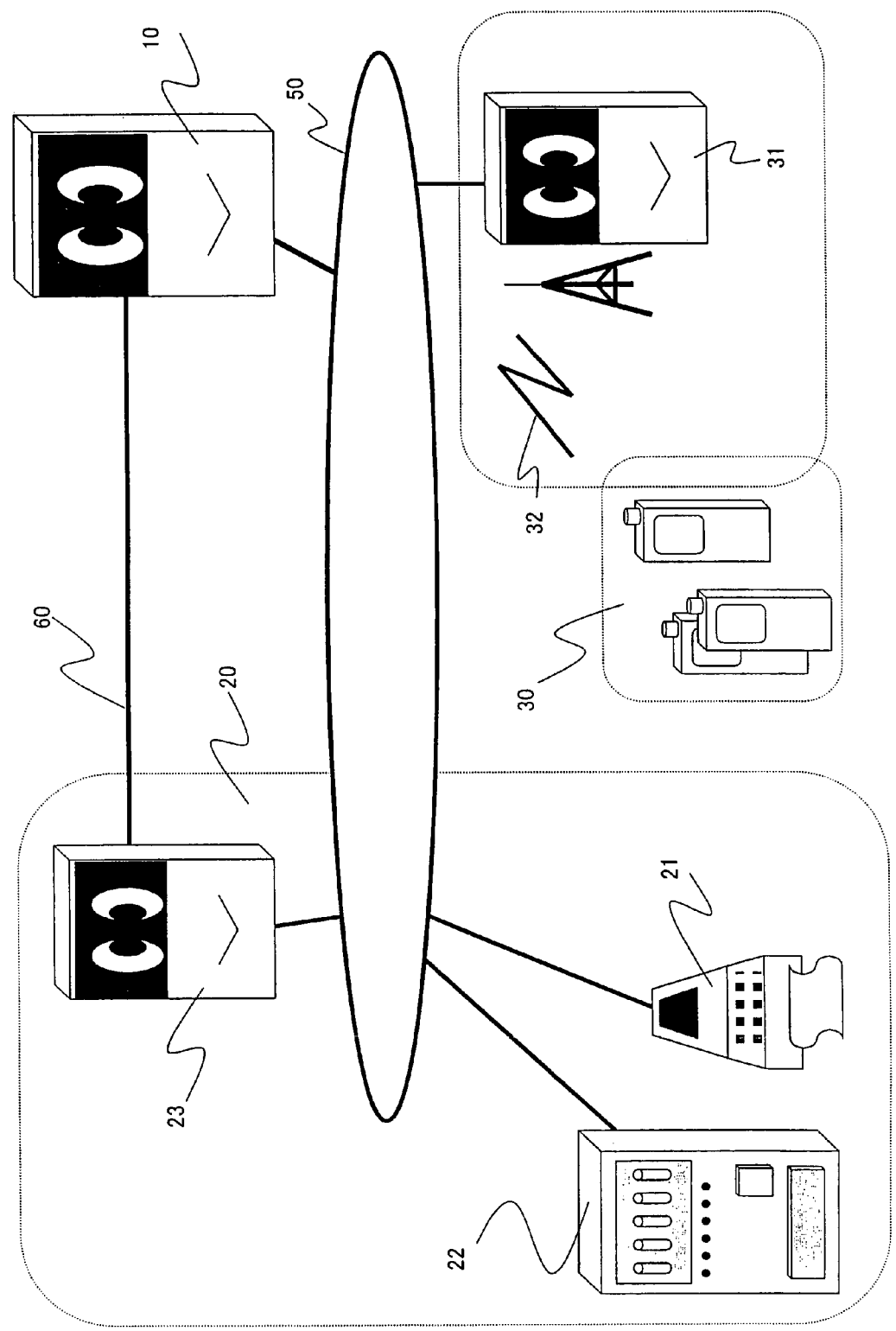
FIG. 1 is a view illustrating an individual authentication system according to the present invention as a whole.

FIG. 1 is a view illustrating an individual authentication method according to the present invention as a whole, and a range 20 enclosed by dotted lines shows the state in which a reader 21 installed at a site for selling or providing various products and services or a reader (not shown) incorporated in an automatic selling machine 22 or the like, and a sales management server 23 for managing the machines and readers are connected to each other through a network 50 such as the Internet.

Conventionally, payment with an ordinary credit card or the like is carried out in this range 20, and in that case a credit card is read by the reader 21 or the like for establishment of individual authentication.

In FIG. 1, a mobile terminal server 31 for managing a group of mobile terminals 30, 30, . . . is connected to a network 50, and the group of mobile terminals 30, 30, . . . and the mobile terminal server 31 are connected to each other by air 32. The reference numeral 10 indicates an authentication server for providing individual authentication to each mobile terminal 30 in the group of mobile terminals 30, 30, . . . , and the authentication server is connected to the network 50 as well as to the sales management server 23 through a dedicated line 60.

Figure 2:
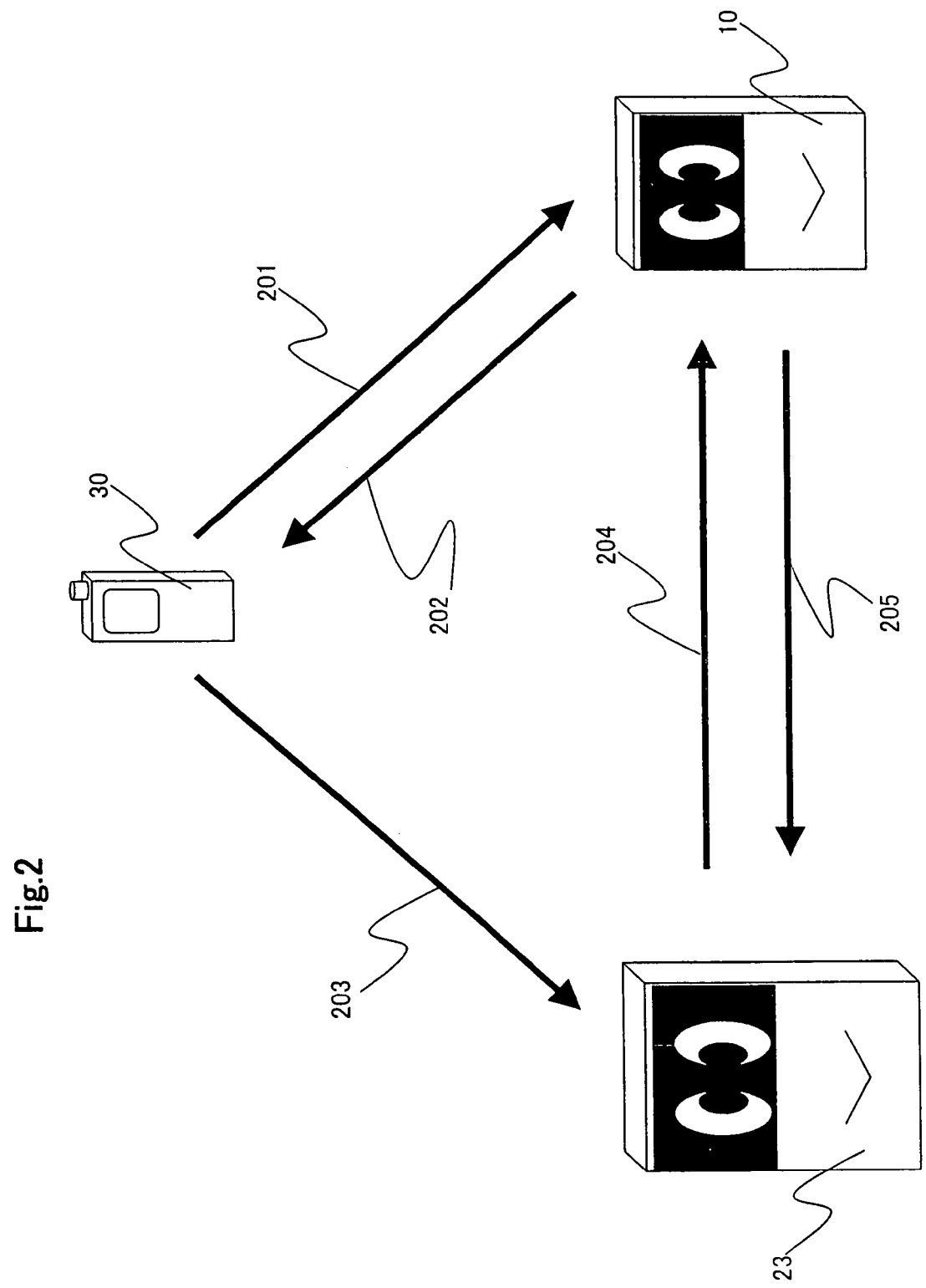
FIG. 2 is an explanatory view showing basic principles of the present invention.

In the method according to the present invention, when an owner of the mobile terminal 30 makes payment for an article for sale or a service, or when the owner tries to identify oneself, the owner uses the mobile terminal 30 in place of a credit card, a debit card, a bank card, or other various types of certificates (such as various types of tickets, ID cards, certificates for payments, and receipts), and the basic principles are described with reference to FIG. 2.

At first, when the owner sends a request for authentication from the mobile terminal 30 to the authentication server 10 (through a path 201), the authentication server 10 transmits verification code for authentication to the mobile terminal 30 (through a path 202). The mobile terminal 30 sends the verification code via the reader 21 or the like to the sales management server 23 (through a path 203). This reader 21 is a non-contact type of reader. The sales management server 23 transmits the verification code to the authentication server 10 to demand authentication (through a path 204). The authentication server 10 verifies the verification code to the verification code generated previously, and returns a result of verification and personal information required by the sales management server 23 to the sales management server 23 (through a path 205).

The verification code for authentication is temporary and meaningless code generated anew when a request is received from the mobile terminal 30, and is never used again not only in response to other mobile terminals 30, but also even if the same mobile terminal 30 sends a request for authentication next time. The term of "meaningless code" as used herein indicates data other than attribute data such as a fixed membership number, ID, a name, an address, a telephone number, product data, and encrypted ones thereof.

It is to be noted that a provider of a product or a service itself may authenticate the owner of the mobile terminal 30 as a user, and the processing by the authentication server 10 and processing by the sales management server 23 are carried out in the same server.

A flow of the verification code is described below again with reference to FIG. 1. When a user makes payment for a product or a service by making use of the reader 21, the automatic selling machine 22, or the like connected to the network 50 as a means for payment, at first individual authentication is required.

The user trying to make payment demands transmission of verification code from the mobile terminal 30, which the user owns, to the authentication server 10. This demand signal is transmitted as electric waves 32 under control by the mobile telephone service enterprise, and reaches the authentication server 10 via the mobile terminal server 31 which is a signal conversion server for connecting to the network 50.

The authentication server 10 generates verification code for the demanding user, and transmits the verification code through the same signal path, but in the reverse direction. The mobile terminal 30 having received the verification code makes the reader 21 or the like read the verification code in the non-contact state, and then the verification code is transmitted through the network 50 to the sales management server 23.

The sales management server 23 transmits verification code to the authentication server 10 for verifying the received verification code. The transmission path used in this step may be the network 50, but the security between the servers should desirably be complete, and a path such as the dedicated line 60 not allowing illegal access thereto is preferable.

The authentication server 10 verifies verification code in the verification signal to the verification code generated previously, and returns a result of the verification and a contents of the demand to the sales management server 23. With this returning step, individual authentication is established, and the subsequent procedure is shifted to the ordinary one specific to each credit company or the like.

Figure 3:
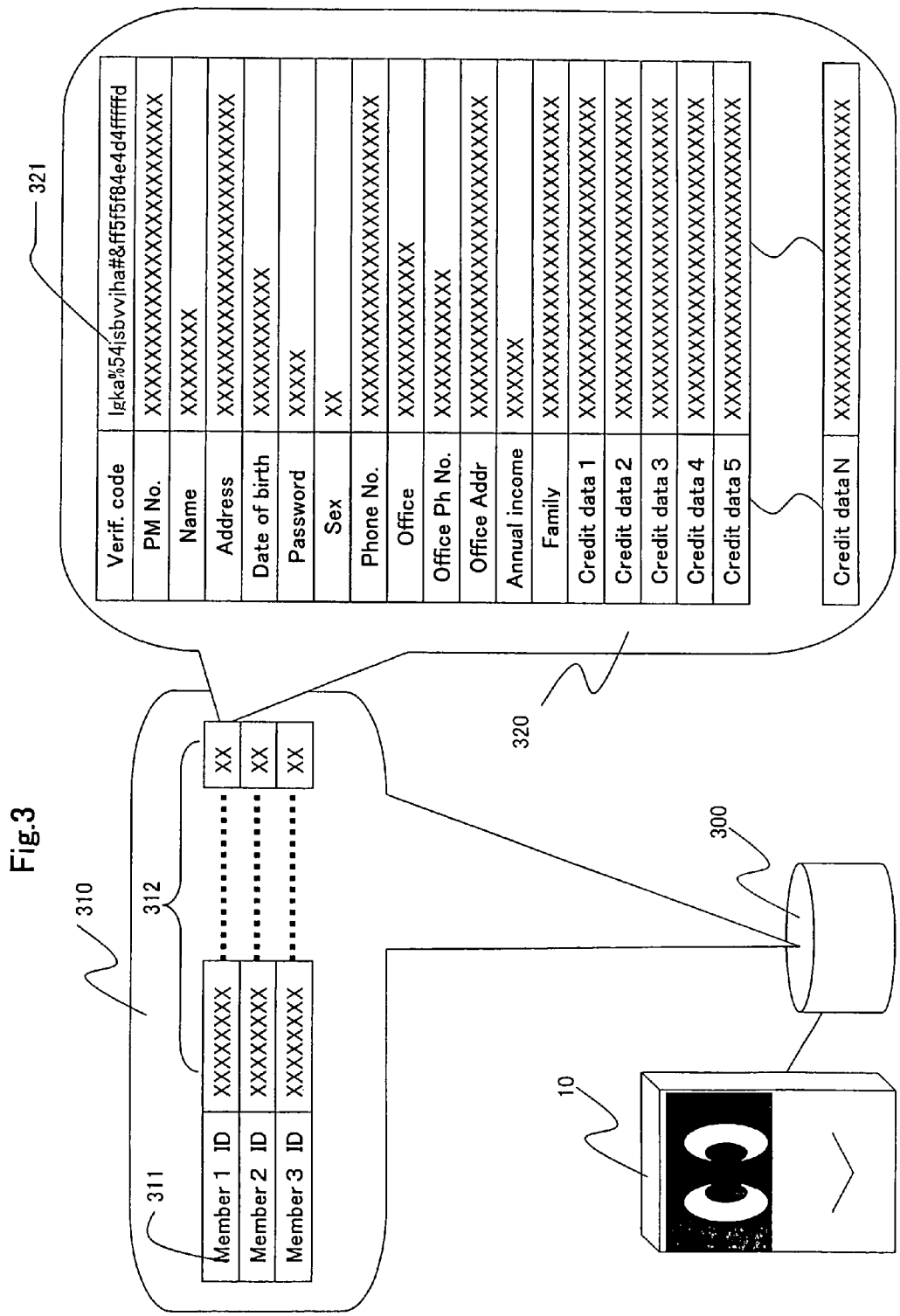
FIG. 3 is a block diagram showing configuration of a data file for individual authentication stored in an authentication server 10.

The "verification code" is described below with reference to FIG. 3 showing configuration of the data files stored in the authentication server 10. In FIG. 3, a data file 310 for individual authentication comprising a group of data records each for individual authentication is recorded in a data recording medium 300 provided in the authentication server 10. Each data record 320 for individual authentication comprising a member ID 311 which is an ID number for each individual and other item 312, and "verification code" 321 is present as one of the items.

Namely, the "verification code" 321 is one piece of data present as one field in the data record 320 for individual authentication in the data file 310 for individual authentication comprising a group of data records stored in the data recording medium 300 in the authentication server 10.

It is to be noted that this data is temporary data which is generated first when a demand signal from the mobile terminal 30 is received, present within a prespecified period of time, and is deleted when a verification signal is not required within a prespecified period of time from the sales management server 23. This data is not fixed ones, and is differentiated each time it is generated in the field. The data is different from significant fixed data such as a data record for individual authentication.

Figure 4:
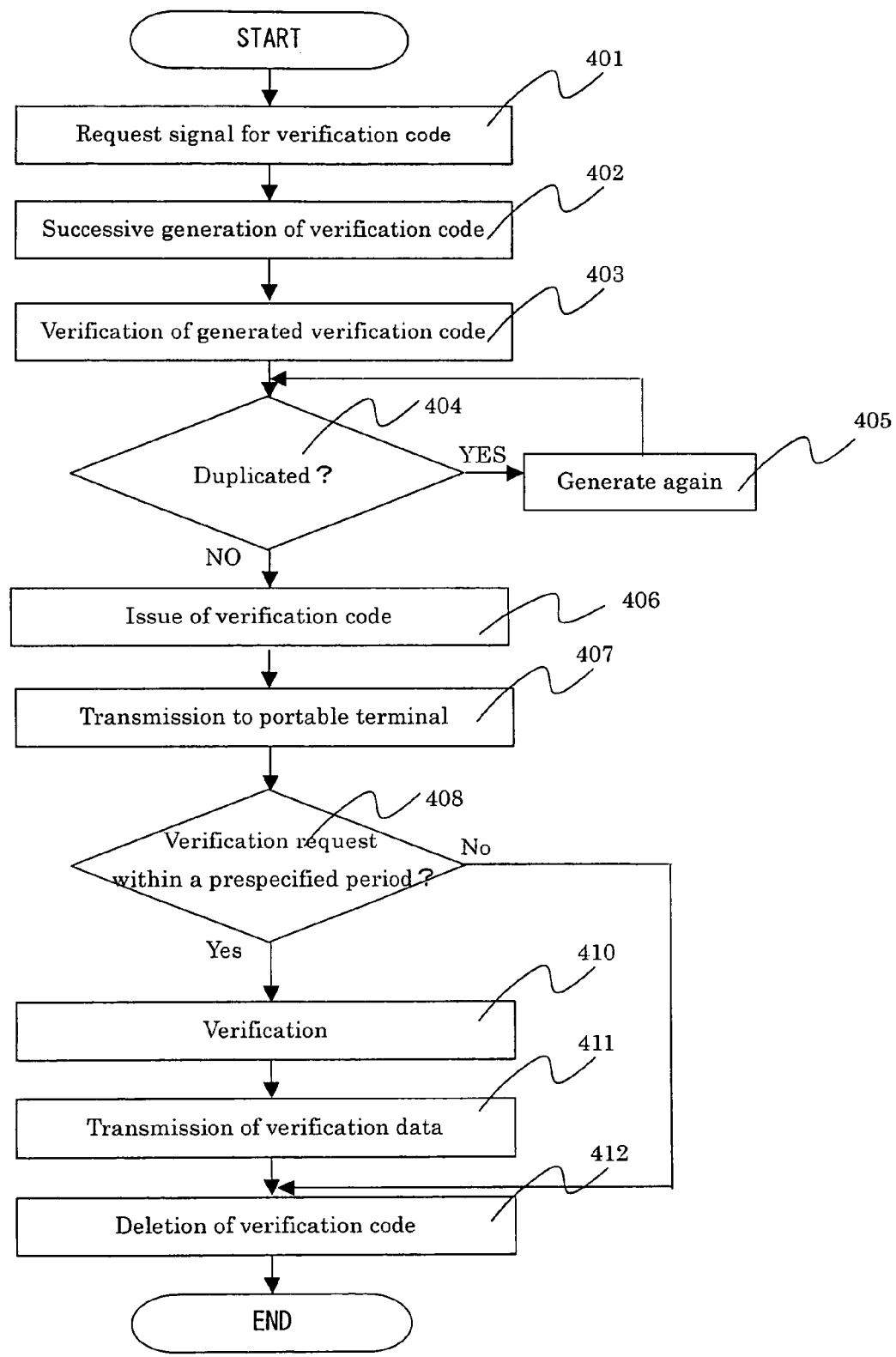
FIG. 4 is a flow chart showing the sequence from generation of "verification code" up to deletion thereof in the authentication server 10.

The operation sequence from generation of "verification code" to deletion thereof in the authentication server 10 is described with reference to FIG. 4.

At first, the authentication server 10 checks, when it receives a demand for verification code from the mobile terminal 30 owned by a registered member (401), whether the sender is the registered member or not.

After authentication of the member is established, the authentication server 10 generates the "verification code" (402), and this verification code is immediately verified to the verification code generation history data (403) to check whether the verification code is one generated in the past or not (404). When the verification code matches the corresponding data generated in the past, a verification code is again generated (405). This operation is executed to prevent the risk that may occur if the verification code generated in the past is known to other person and the person illegally uses this verification code.

The verification code generated as described above is issued (406), and is transmitted to the mobile terminal 30 (407). Then the verification code is put under control by a timer or the like, and checking if a request for verification is received from the sales management server 23 is carried out (408), and if it is determined by a timer or the like that a verification request for the verification code has not been received within a prespecified period of time (412), the verification code is deleted. When it is determined that a verification request has been received from the sales management server 23 within the prespecified period of time, the received verification code is verified to the one generated in the past (410) with the demanded personal data transmitted (411), and at the same time the generated "verification code" is deleted (412).

Figure 5:
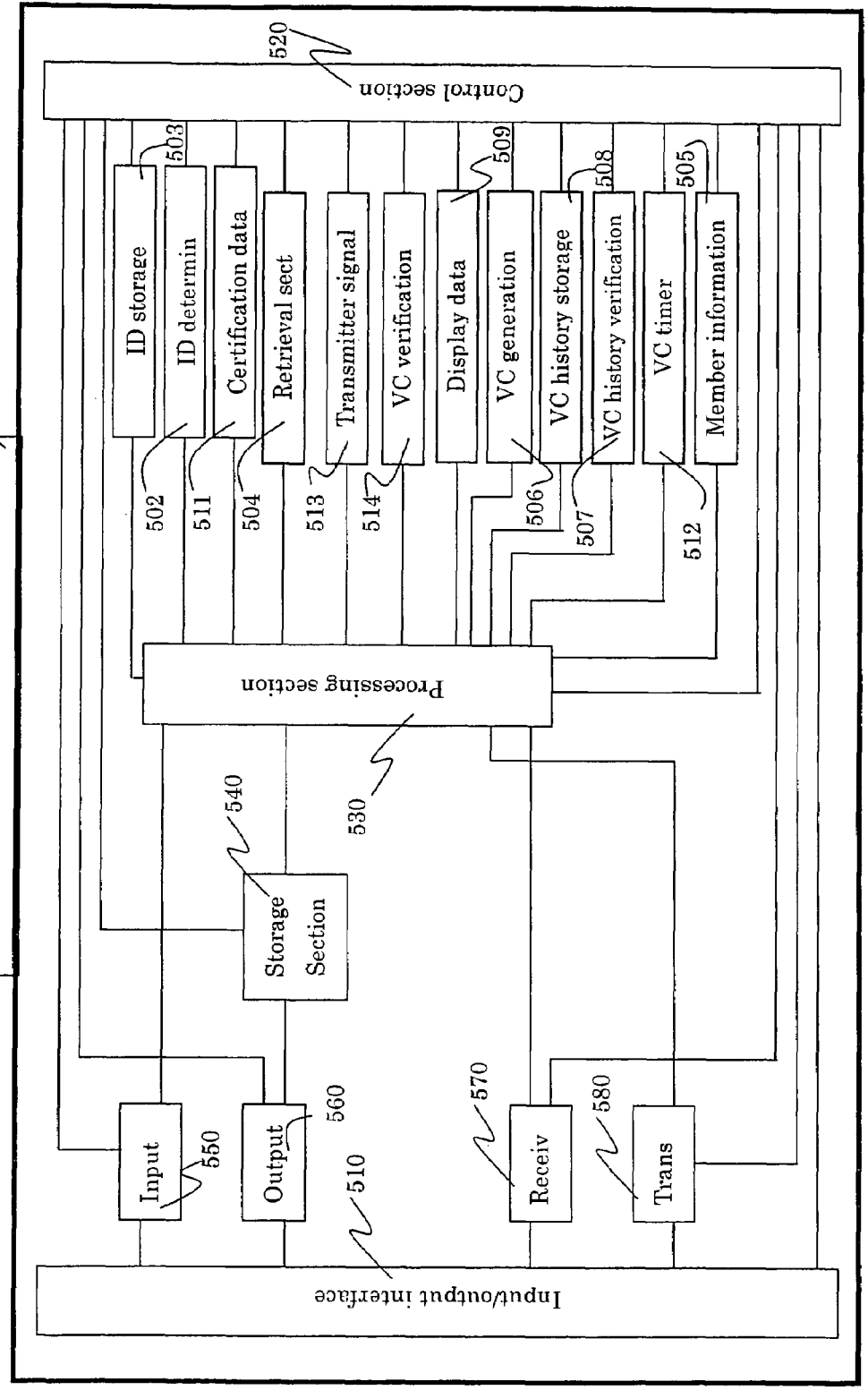
FIG. 5 is a block diagram showing configuration of the authentication server 10.

FIG. 5 is a block diagram showing configuration of the authentication server 10. The server 10 comprises, as component sections which should generally be arranged for executing processing, input/output, and receiving and transmission of various types of data, a control section 520 for controlling operations of the authentication server 10 as a whole, a processing section 530 for processing data, an input/output interface 510 connected to various types of input/output devices as well as to the network 50 and the like, an input section 550 for receiving data from the input/output interface 510, an output section 560 for outputting data, a storage section 540 for temporally storing therein data during the data processing, a receiving section 570 for receiving various types of data, and a transmission section 580 for transmitting various types of data.

The authentication server 10 further comprises, in addition to the component sections which is to be usually provided therein, an ID determination section 502 for determining an ID of a demand signal or a verification signal, an ID storage section 503 for storing therein registered IDs, a registered data retrieval section 504 for retrieving, from a registered member number, information concerning the member, a member information storage section 505 for storing therein membership information such as verification code data, a verification code generation section 506 for generating new verification code, a verification code history checking section 507 for checking whether the new verification code data matches any of verification code data generated in the past, a verification code history storage section 508 for storing therein verification code data generated in the past, display data generation section 509 for converting the verification code data to those with a display format for a mobile terminal, an authentication data generation section 511 for extracting and generating personal data demanded with a verification signal, a verification code timer control section 512 for controlling new verification code data as a portion of membership information, a transmit signal generation section 513 for converting the personal data generated in the authentication data generation section 511 to those with a format prespecified for the sales management server 23, and a verification code checking section 514 for checking whether the verification code in a verification signal from the sales management server 23 matches any of verification code stored therein or not.

Actions of the authentication server 10 are described below.

In the authentication server 10, a demand signal for verification code from the mobile terminal 30 is transmitted via the interface 510 to the receiving section 570. When the processing section 530 receives an instruction from the control section 520, the processing section 530 sends to the ID determination section 502 an inquiry for checking whether the demand signal is a signal previously registered, and then the ID determination section 502 verifies the demand signal to the data stored in the ID storage section 503, and when it is determined that the received signal is a registered one, the ID determination section 502 transfers the signal to the storage section 540.

The transferred demand signal is verified by the processing section 530 having received the instruction from the control section 520 to the registered data retrieval section 504 to check which member ID 311 the demand signal corresponds to, and the registered data retrieval section 504 verifies the signal to the membership information storage section 505 and notifies the processing section 530 of the data. The processing section 530 having received the data instructs the verification code generation section 506 to generate new verification code data in a verification code field of the corresponding data, and transfers the generated new verification code data to the storage section 540. Then the processing section 530 makes an inquiry to the verification code history verification section 507 to check whether the new verification code data is duplicated with any verification code data generated in the past or not. The verification code history verification section 507 makes an inquiry to the verification code history storage section 508, and when it receives that the new verification code data is duplicated any one generated in the past, the verification code history verification section 507 again instructs the verification code generation section 506 to generate new verification code data in the verification code field of the corresponding data, and repeats this operation until it is determined that the newly generated verification code is not duplicated with any one generated in the past.

When the processing section 530 receives the information that the newly generated verification code data is not duplicated with any one generated in the past, the processing sequence is shifted to the next job, and in this case, the verification code data is stored in the membership information storage section 505, and at the same time the processing section 530 instructs the display data generation section 509 to convert the data format to a prespecified one described hereinafter and transmit the data with the format converted to the storage section 540. The new verification code data with the data format having been converted is transferred by the processing section 530 having received an instruction from the control section 520 to the transmission section 570, and is transmitted therefrom via the input/output interface 510 to the demanding mobile terminal 30. Then the new verification code data is put under control by the verification code timer management section 512, and the new verification code data is automatically deleted by the verification code timer management section 512 unless a verification signal is not received within a prespecified period of time from the sales management server 23.

The meaningless and not-fixed "verification code" as described above must be disposed each time the code is used, and a vast number of verification code is required for carrying out the present invention. However, on the screen comprising alphabets and figures, although it is dependent on the display capability of each mobile terminal, it is conceivable that a number of digits displayable at once is at most 100 digits, and a number of combinations is $36^{100}$.

The method according to the present invention is for substantially increasing the "number of combination", and there is provided an image signal generation section for displaying an image on the mobile terminal 30 as the display data generation section 509 of the authentication server 10, and this displayed image is read with the reader 21.

Next, the method according to the present invention is described with reference to the case in which individual authentication performed with the mobile terminal 30 when an owner of the mobile terminal 30 passes through a gate.

Figure 6:
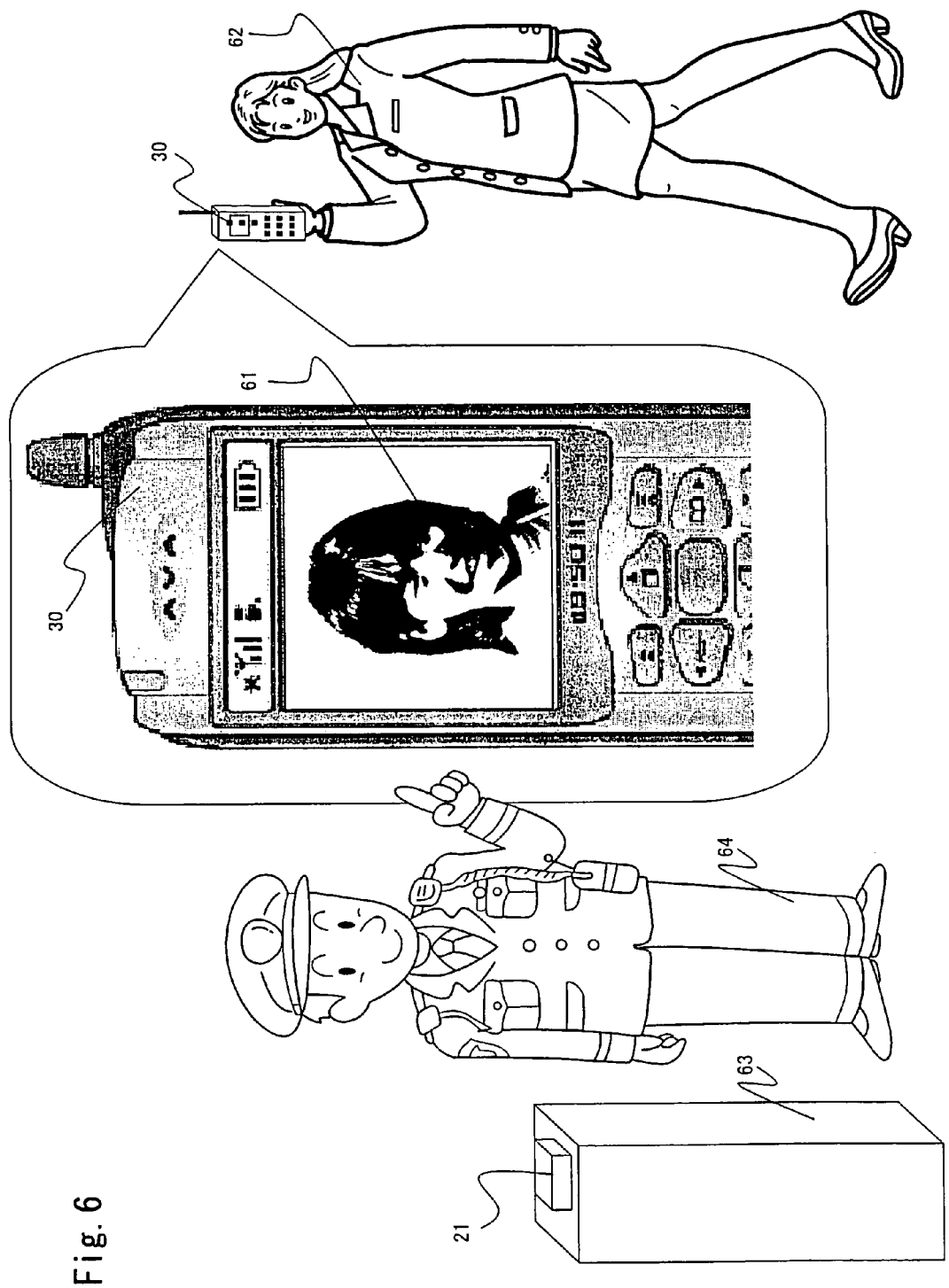
FIG. 6 is an explanatory view showing individual authentication carried out when the user passes through a gate.

As shown in FIG. 6, when an owner 62 of the mobile terminal 30 tries to pass through a gate 63, the owner 62 has a screen for authentication displayed on the mobile terminal 30 carried by the owner 62. As an image of the owner's face previously registered by the owner in the authentication server 10 is displayed with colors, so that, when the authentication screen 61 is shown to a guard (or a bouncer) 64, the owner's face is visually verified to the face image displayed on the mobile terminal 30 for verification, thus the owner being identified.

Then the person 62 to be authenticated gets the authentication screen 61 of the mobile terminal 30 closer to the reader 21 installed at or near the gate 63 to have the "verification code" displayed in the dot form with specific colors on the authentication screen 61 read by the reader 21. As described hereinafter, a dot information analysis section 102 for analyzing the dot display is provided in the reader 21.

In the present invention, there is no restriction over the display image displayed on the authentication screen 61, and is not always required. When checking is carried out doubly, namely visually and with any equipment, it is possible to clear the limits of security depending only on a system such as those caused by loss and theft of the mobile terminal 30, or blackmailing. The display image provided on the authentication screen 61 may be, in addition to an image of the owner's face, other image, an illustration, a picture, or the like. The configuration is allowable in which a liquid crystal screen or the like (not shown) is provided at the gate 63 and the authentication screen 61 on the mobile terminal 30 is displayed on the liquid crystal screen or the like so that visual checking can be performed doubly.

As well known, a liquid crystal screen of the mobile terminal 30 comprises a fine square area (dot) as a unit, and an image is displayed by generated various colors on the dots respectively. In this invention, specific colors are generated on a plurality of prespecified dots which are provided in a prespecified arrangement respectively, and the "verification code" is formed with an array of the specific colors.

Figure 7:
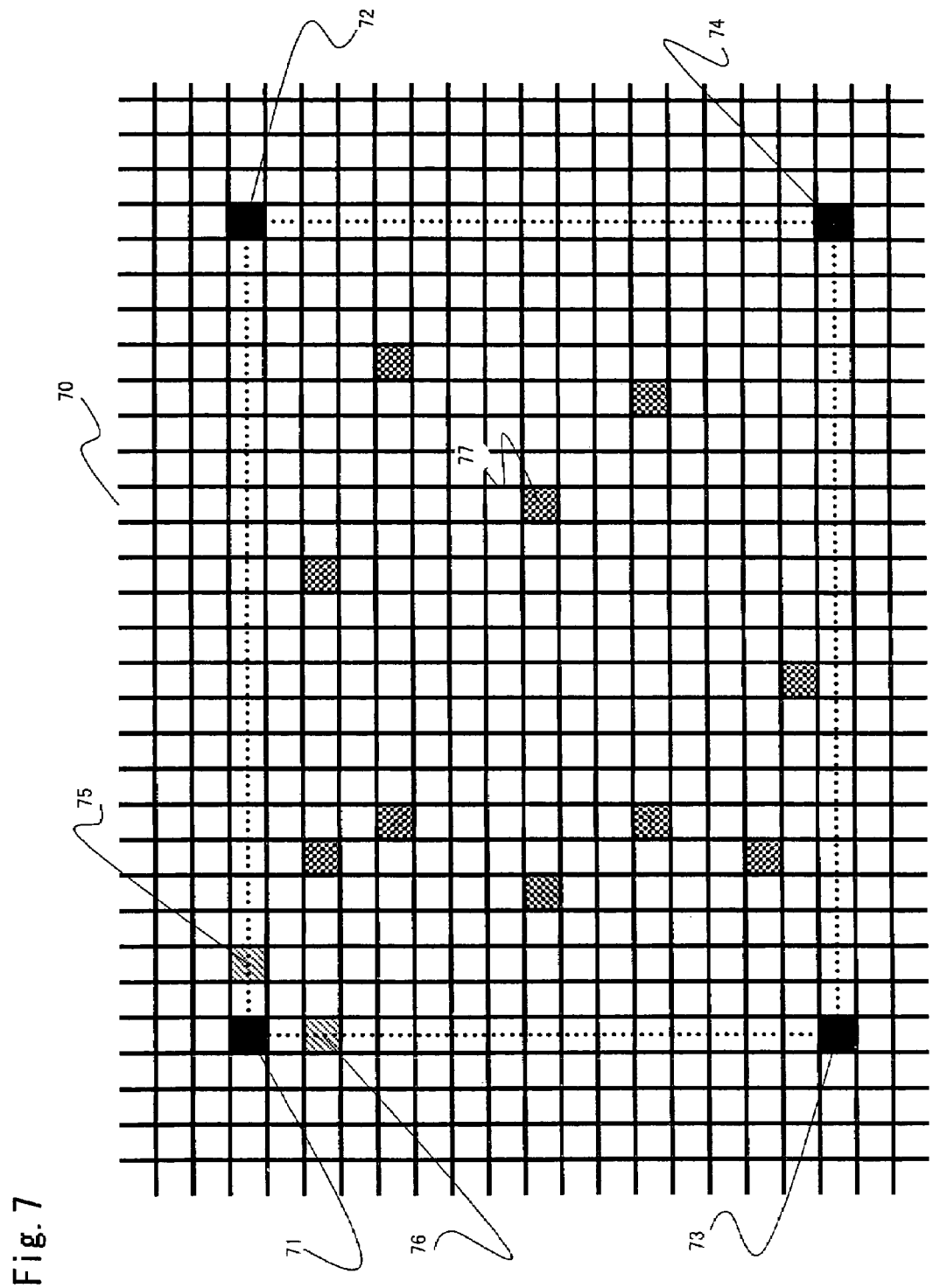
FIG. 7 is an enlarged view of a authentication screen of a mobile terminal 30 on which "verification code" is displayed.

Namely, it is possible to give coordinate values to each of the dots 70, 70, . . . regularly arranged in the vertical and horizontal directions on the liquid crystal screen as shown in FIG. 7, and a combination of the coordinate points formed with a plurality of dots 70, 70, . . . is given as one verification code. In the above description, 1 dot is regarded as one unit, but a combination of a plurality of dots may be regarded as one unit.

In FIG. 7, at first, a display range formed with dots 70, 70, . . . each constituting the verification code is defined by four dots, namely any given start point 71, a second point 72 defining one edge which is a horizontal base line including the start point 71, a third point 73 defining another one edge which is a vertical base line including the start point 71, and a fourth point 74 located at an intersection point of the vertical line including the second point 72 and the horizontal line including the third point 73. Thus, a number of dots 77, 77, . . . each constituting the verification code are present within the square display area.

At the start point 71 and a horizontal pitch measuring point 75 on the horizontal base line, a dot pitch varying for each part is measured on the liquid crystal screen. Similarly, at the start point 71 and on a vertical pitch measuring point 76 on the vertical base line, a vertical dot pitch on the liquid crystal screen is measured. By measuring dot pitches on the liquid crystal screen, the dots 77, 77, . . . can be analyzed as coordinate points respectively, and can be converted to the "verification code".

Preferably, the color displayed on the start point 71, second point 72, third point 73, fourth point 74, a display color on the dots 77, 77, . . . , and display colors on the horizontal pitch measuring point 75 and vertical pitch measuring point 76 should be differentiated from each other.

Figure 8:
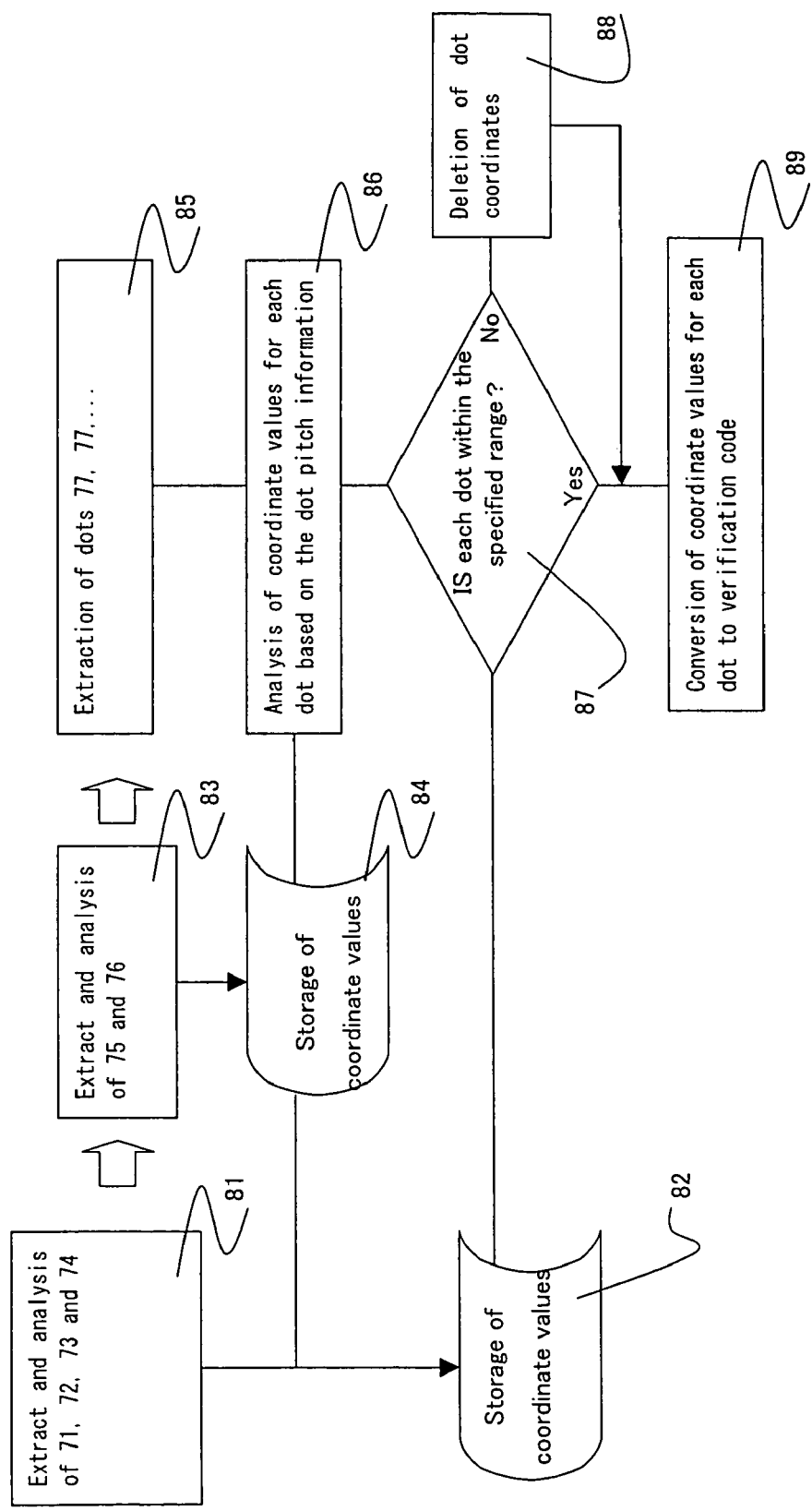
FIG. 8 is a flow chart showing the operating sequence of extraction, analysis, and conversion of dots constituting the verification code.

The processing for extracting, analyzing, and converting the dots 77, 77, . . . each constituting verification code is described below with reference to the flow chart shown in FIG. 8.

At first, the start point 71, second point 72, third point 73, and fourth point 74 on the liquid crystal screen are extracted and analyzed (81), and the obtained information on the coordinate points is temporally stored in a specified range coordinate storage section (82). Similarly, the horizontal pitch measuring point 75 and vertical pitch measuring point 76 are extracted and analyzed (83), and the obtained dot pitch information is temporally stored in a dot pitch information storage section respectively (84).

Then the dots 77, 77, . . . each constituting the verification code are extracted (85), and coordinate values of the dots 77, 77, . . . are analyzed by referring to the dot pitch information stored in the dot pitch information storage section (86). The analyzed coordinate values are checked by referring to the coordinate information stored in the specified range coordinate storage section to determine whether the coordinate points are within the specified range or not (87). The coordinate points not present within the specified range are deleted (88), and only the coordinate values for the coordinate points within the specified range are converted (89) as the "verification code". An arrangement of the coordinate points may be converted to an array of a plurality of coordinate values, or to other figures, letters, or a mixture of figures and letters based on a coordinate conversion table.

Configuration of the image signal generation section is described below.

Figure 9:
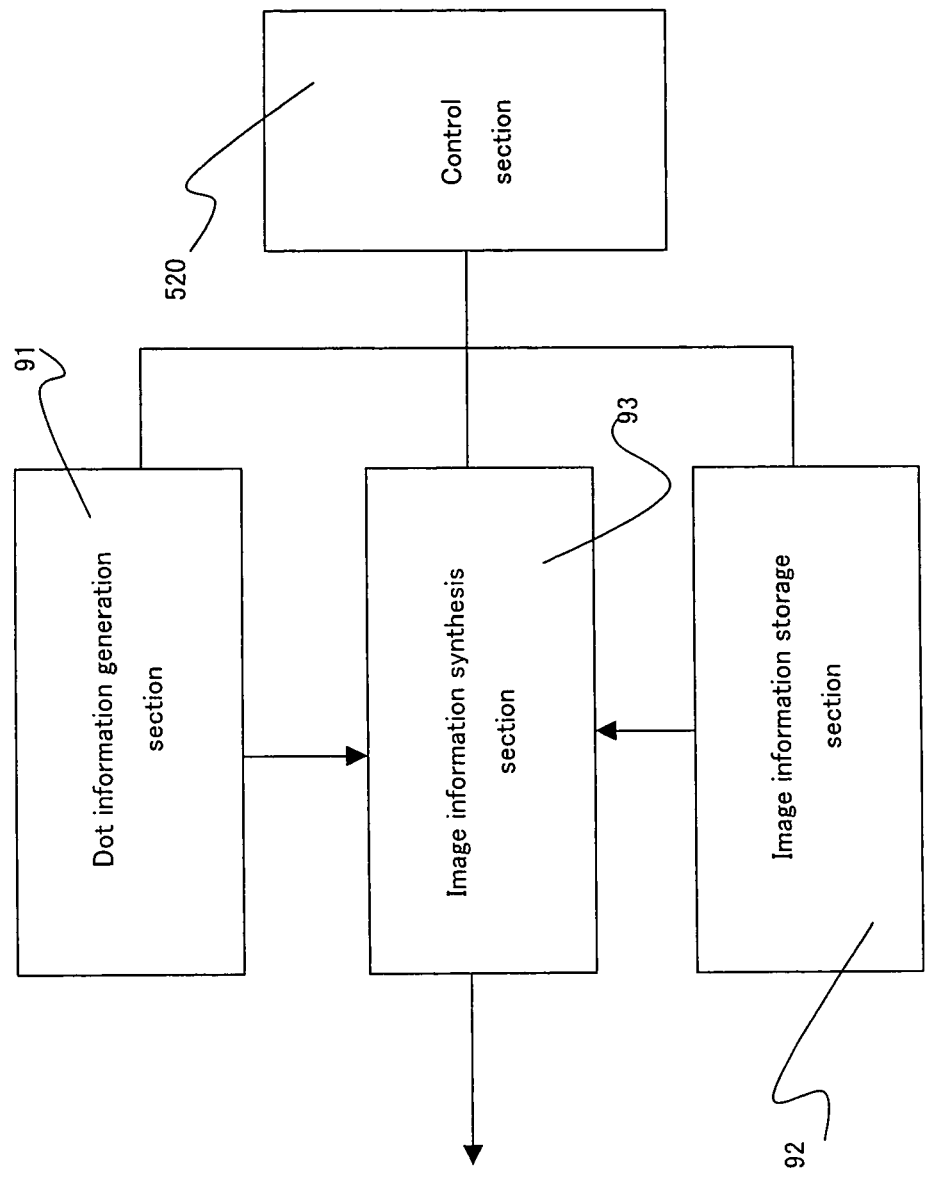
FIG. 9 is a block diagram mainly showing a display data generating section 509 of the authentication server 10 in which an image signal is generated.

FIG. 9 is a block diagram mainly showing a section for generating an image signal in the display data generation section 509 in the authentication server 10, and the section comprises a dot information generation section 91 for generating a dot arrangement image with a specific color, an image information storage section 92 with, for instance, face picture data previously registered by each user stored therein, and an image information synthesis section 93 for synthesizing the two types of image.

In FIG. 9, the verification code generated in the verification code generation section 506 in the authentication server 10 is put under control by the control section 52 according to an instruction from the processing section 530, and is sent to the dot information generation section 91. The dot information generation section 91 generates a dot image with a plurality of specific colors arranged as shown in FIG. 7 based on the verification code and according to a prespecified rule. Next, the image information synthesis section 93 fetches a face picture image of a member having demanded the verification from the image information storage section 92 and synthesizes the face picture image with the dot image. The image signal including the synthesized "verification code" is delivered to the processing section 530 according to an instruction from the control section 520. Preferably the face picture image should be subjected to the processing for removing the specific colors having been given to the dot image before the synthesizing step.

The "specific colors" may be specifically fixed ones, but also may be varied according to some conditions such as, for instance, a unit like a date or time of a day, or a purpose of the use.

Figure 10:
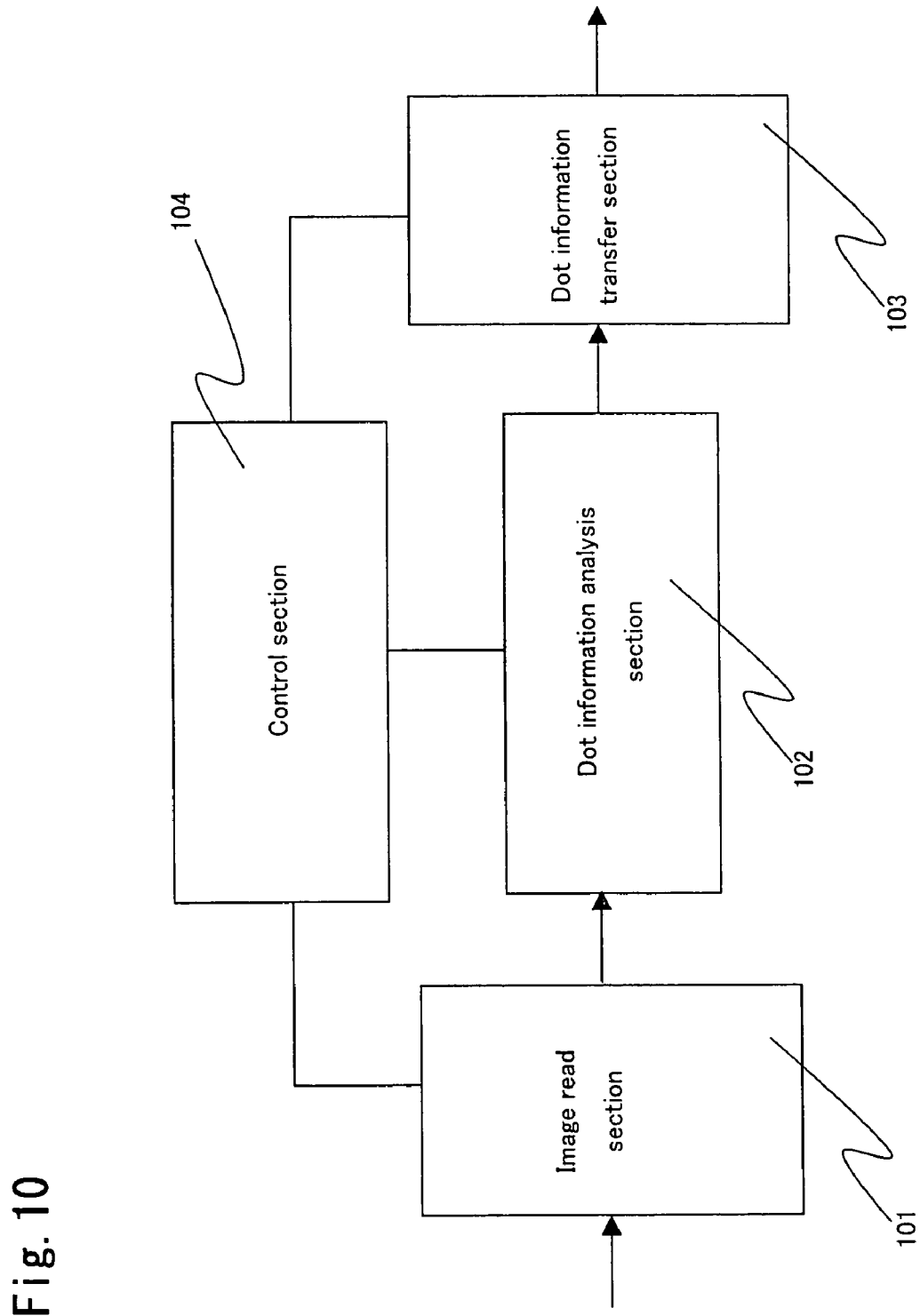
FIG. 10 is a block diagram mainly showing a dot information analyzing section 102 of a reader 21.

The dot information analysis section 102 is described with reference to a block diagram of the reader 21 shown in FIG. 10.

The reader 21 comprises an image read section 101 for reading an image displayed on the authentication screen 61 of the mobile terminal 30, the dot information analysis section 102 described above, a dot information transfer section 103 for transferring the signal converted to the "verification code" to a prespecified section described below, and a control section 104 for controlling the sections above.

In the gate 63, the synthesized image information read from the image read section 101 of the reader 21 is subjected to the processing for extraction and analysis of "verification code" according to each specific color as a key in the dot information analysis section 102. The information having been converted to the "verification code" is transferred by the dot information transfer section 103 to a section having a communicating function in the gate 63, and is further transmitted to the sales management server 23. All of the controls in this step are provided from the control sections 104.

The sales management server 23 transmits the verification signal to the authentication server 10, and the verification code is sent via the input/output interface section 510 of the authentication server 10 to the receiving section 570. The processing section 530 makes an inquiry to the ID determination section 502, according to an instruction from the control section 520, to check whether the verification signal corresponds to any data previously registered in the sales management server 23 having the business connection therewith or not, and the ID determination section 502 verifies the verification signal to the data stored in the ID storage section 503 and transfers the verification signal to the storage section 540 after it is determined that the signal corresponds to any data registered therein.

Then the processing section 530 instructs the verification code verification section 514 to verify the transferred verification signal. The verification code verification section 514 extracts verification code from the verification signal in the storage section 540, verifies the verification code to the membership information storage section 505 with the verification code stored therein, and returns the member's ID 311 to the processing section 530 when it is determined that the verification code corresponds to any one stored therein.

The processing section 530 having received the member ID 311 instructs the authentication data generation section 511 to extract and generate personal data required by the transferred verification signal from the membership information storage section 505. This personal data is transferred by the processing section 530 having received the instruction from the control section 520 to the storage section 540. The personal data in the storage section 540 is converted, upon an instruction from the processing section 530 having received an instruction from the control section 520, to data with a signal format previously decided by the transmission signal generation section 513 such as, for instance, a prespecified format such as those based on the publicized key encryption system or the common key encryption system, and is transferred to the transmission section 580, where the data is transmitted to the sales management server 23 demanding the personal data via the input/output interface section 510.

As described above, in the embodiment of the present invention, it is assumed that the wire tapping may be carried out illegally on a network not having the security therein such as the Internet, and as the countermeasures for establishing the security, only temporally generated meaningless signals are used to evade distribution of meaningful signals, and meaningful signals are used only between systems having established the security at a high level respectively.

With the invention described in the first aspect, it is possible to establish safe and quick individual authentication by using a mobile terminal. Therefore, it is possible not only to prevent such accidents as theft of fixed data such as credit cards, debit cards, bank cards, and other various types of certificates which may easily be forged as well as errors in decoding encrypted data therefrom, but also to provide an extremely useful means for payment in cyber businesses expected to substantially grow in the figure.

With the inventions described in the second to four aspects, easy and quick individual authentication can be realized, and also data for individual authentication can be transferred between a mobile terminal and a reader in the non-contact form, so that such troubles as physical damages to the mobile terminal never occur.

With the inventions described in the fifth to seven aspects, it is possible to further improve the security.

The invention claimed is:

1. An individual authentication method comprising the steps of:
   receiving, at a mobile terminal, a verification code generated by an authentication server in response to a request from the mobile terminal;
   returning the verification code through a sales management server to the authentication server;
   verifying the verification code generated in said authentication server to verification code transmitted from the sales management server; and
   transmitting personal information corresponding to the verification code to said sales management server when it is determined that the two verification codes are identical, wherein an original face picture corresponding to the personal information and a dot arrangement with a plurality of specific colors different from bar code are received as the verification code by said mobile terminal and are displayed.

2. The individual authentication method according to claim 1, wherein the verification code received by said mobile terminal is read with an image reader having means for analyzing a dot display with specific colors and connecting to said sales management server.

3. The individual authentication method according to claim 1, wherein said dot arrangement with specific colors is provided with coordinate information.

4. The individual authentication method according to claim 1, wherein said verification code comprises code having no relation to said personal information.

5. The individual authentication method according to claim 1, wherein said verification code is not identical to any verification code generated in the past in said authentication server.

6. The individual authentication method according to claim 1, wherein said generated verification code is deleted within a prespecified period of time after generation thereof for disenabling the verification.

7. An individual authentication method comprising the steps of:
   receiving, at a mobile terminal, a verification code generated by an authentication server in response to a request from the mobile terminal;
   returning the verification code through a sales management server to the authentication server;
   verifying the verification code generated in said authentication server to verification code transmitted from the sales management server; and
   transmitting personal information corresponding to the verification code to said sales management server when it is determined that the two verification codes are identical,
   wherein the verification code received by said mobile terminal is displayed in a rectangular display range starting from first to fourth points as a dot arrangement with a plurality of specific colors distinguishable from colors of the first to fourth points, and
   the verification code received by said mobile terminal is read with an image reader having means for analyzing the dot arrangement with specific colors and connected to said sales management server.

8. The individual authentication method according to claim 7, wherein said mobile terminal displays, in addition to the dot arrangement as the verification code and the first to fourth points, a horizontal pitch arrangement point and a vertical pitch measuring point as specific colors distinguishable with those of the first to fourth points and the dot arrangement of the verification code, said image reader analyzing dot pitch information of the dot arrangement by the horizontal and vertical pith arrangement points.

9. The individual authentication method according to claim 7, wherein said verification code comprises code having no relation to said personal information.

10. The individual authentication method according to claim 7, wherein said verification code is not identical to any verification code generated in the past in said authentication server.

11. The individual authentication method according to claim 7, wherein said generated verification code is deleted within a prespecified period of time after generation thereof for disenabling the verification.

* * * * *